May 10, 1960 K. K. D. JIN 2,936,412
SPEED CONTROL FOR ELECTRIC MOTORS
Filed May 4, 1959

Inventor
Korda K. D. Jin

By Slough & Slough

Attorneys.

United States Patent Office 2,936,412
Patented May 10, 1960

2,936,412
SPEED CONTROL FOR ELECTRIC MOTORS

Korda K. D. Jin, Elyria, Ohio, assignor to The General Industries Company, Elyria, Ohio, a company of Ohio Application May 4, 1959, Serial No. 810,703

7 Claims. (Cl. 318—325)

My invention relates to improvements in electric motors of the type adapted to be actuated by low voltage sources such as batteries, and relates more specifically to improvements in the governing of the speed of such motors.

One of the problems which has been encountered in building battery type motors of the type adapted for use with phonographs has been the limited range of voltage and/or torque that is controllable by the governor.

It is an object of my invention, therefore, to provide an improved motor of the type referred to having a broadened range of governor control.

It is another object of my invention to provide a motor of the type referred to which is simple and compact in construction, permitting ease in manufacture, economies, and having a capability of operating under a wide range of service conditions.

Another object of my invention is to provide a motor of the type referred to wherein the motor is, for the most part, completely de-energized when the governor contacts are open thus increasing the effectiveness of the governor.

Other objects of my invention and the invention itself will become apparent from the following description and the accompanying drawings, in which said drawings.

The present device includes the use of a motor governor switch of the type disclosed in application Serial No. 707,439, now Patent No. 2,883,598, of Emil S. Tamm.

Figure 2:
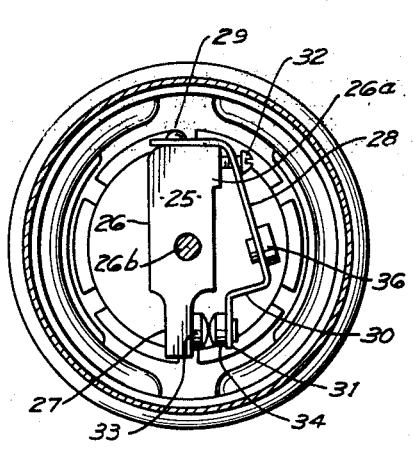
Fig. 2 is a transverse section taken along the line 2—2 of Fig. 1.
Figure 1:
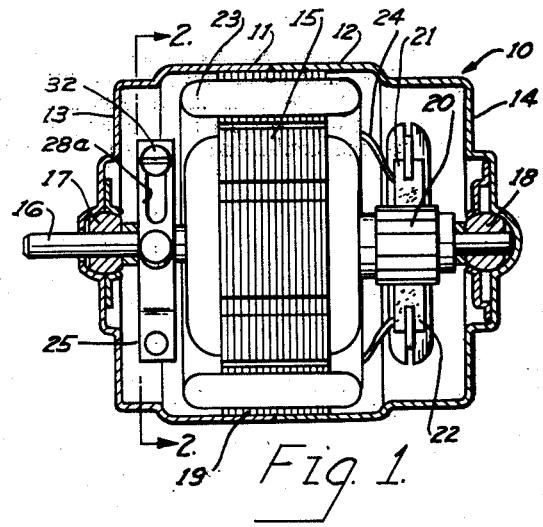
Fig. 1 is a longitudinal section of an electric motor having a centrifugal governor switch mounted thereon.

Referring now to the drawings, and particularly to Figs. 1 and 2, at 10 I show an electric motor encased in complementary housing portions 11 and 12 having end walls 13 and 14 respectively. An armature 15 is unitarily mounted upon a motor shaft 16, said shaft being journalled at one end thereof within a bearing 17 in the end wall 13 and at the other end within a bearing 18 in the end wall 14. The armature 15 rotates in a field 19 mounted within the housing portions 11 and 12.

A commutator 20 is concentrically mounted upon the shaft 16 and disposed between the armature 15 and the bearing 18. A pair of brushes 21 and 22 are suitably mounted within the housing portion 12 and are adapted to resiliently contact the commutator 20 in a conventional manner at diametrically opposite points. The brushes 21 and 22 are connected to field coils 23 by wires 24 whereby electrical current is transmitted from a battery or other source of direct current (not shown) to the armature 15.

The speed of the motor is controlled by a centrifugal governor 25 mounted to rotate within the motor shaft 16 intermediate the armature 15 and the bearing 17. The governor comprises a generally rectangular plate 26 having a longitudinally extending stem portion 27. A flat, leaf type spring 28 is suitably secured to the end of the plate 26 opposite the stem 27 by means of a rivet 29, said spring being bent whereby the free end thereof is positioned adjacent said stem. The free end of the spring 28 is provided with an inwardly directed step portion 30 terminating in a foot 31. The spring 28 diverges from the plate 26 in the direction of the stem 27, the step portion 30 providing means whereby the foot is positioned adjacent the stem 27.

As shown in Fig. 1, the spring 28 is longitudinally slotted at 28a adjacent the uppermost end of the plate 26. An adjustment screw 32 projects through the slot 28a and is thread-fitted into a laterally stepped, enlarged portion 26a of the plate 26 whereby the rotation of said screw adjusts the tension of the spring 28. By tightening the screw 32, the spring 28 biases the foot 31 inwardly toward the plate 26 under increased tension; by loosening the screw, the tension is thereby decreased.

A pair of contact points 33 and 34 are rigidly and coaxially mounted upon the stem 27 and the foot 31 respectively. The tension on the spring 28 is adjusted by the adjustment screw 32 whereby the contacts 33 and 34 are normally in resilient abutting relationship.

A governor weight 36 is rigidly mounted upon the spring 28 intermediate the adjustment screw 32 and the step 30. By referring to Fig. 2, it will be noted that said governor weight is positioned radially outwardly from the center of rotation of the governor 25 and the armature shaft 16.

The above described governor is provided with an aperture 26b in the plate 26 whereby it is telescoped over the shaft 16 and rigidly maintained thereupon in any suitable manner to rotate with the said shaft.

When the motor 10 is operating, the contact 34 is subjected to oppositely acting forces; the tensioned spring 28 urges it inwardly to abut the contact 33 and the centrifugal force effected by the governor weight 36 urges it outwardly therefrom.

By proper adjustment of the screw 32, the governor contacts 33 and 34 separate at a predetermined rate of rotation. The opening of the contacts 33 and 34 de-energizes the armature 15, in a manner to be herein later more fully described, thereby controlling the maximum speed of the motor 10.

Figure 3:
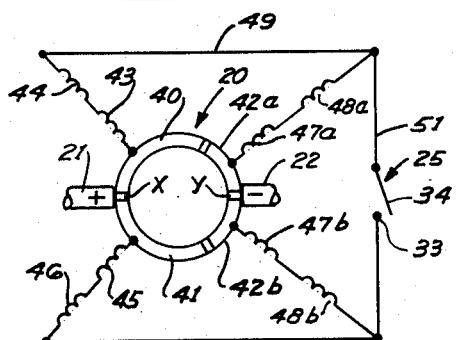
Fig. 3 is a diagrammatic view of one form of my invention showing the armature connections with the armature and centrifugal control switch used.

Referring now to the diagrammatic showing of Fig. 3, I show a circuit arrangement adapted for use with a six pole armature wherein the commutator 20 is circumferentially divided into three equal segments, one of said segments being sub-divided into two portions of equal size. The larger segments, each of which includes approximately one-third of the circumference of the commutator, are designated 40 and 41. The relatively smaller segments are shown at 42a and 42b. The armature windings comprise coils 43, 44, 45, 46, 47a—47b, and 48a—48b. Said coils are preferably wound with one coil over two poles in overlapping relation, but it will be understood that each winding may encompass more or less than two poles in any desired manner.

The coils 43 and 44 each form a separate winding and are connected in series to the commutator segment 40; the coils 45 and 46 also each form a separate winding and are connected in series to the commutator segment 41. The remaining two windings of the armature are wound in a similar fashion except that a double strand of wire is used thereby providing two parallel coils for each of said remaining windings. One of said remaining windings is provided with the coils 47a—47b and the other of said windings is provided with coils 48a—48b. The coils 47a and 48a are connected in series with each other and to the small segment 42a at one end; the coils 47b and 48b are similarly connected in series with each other with one end thereof connected to the small segment 42b. The outer ends of the pairs of coils 43—44 and 47a—48a are connected by means of the line 49; the pairs of coils 45—46 and 47b—48b are connected by means of the line 50; and the outer ends of the pairs of coils 47a—48a and 47b—48b are similarly connected by means of the line 51. The governnor 25 is interposed in the said line 51. The outer ends of the coils 43—44 and 45—46 are not connected and, therefore, provide an open circuit position.

With the above arrangement, it will be seen, therefore, that the commutator is divided into equal sections, each half comprising a large and small segment wherein the larger thereof is substantially twice the size of the smaller and wherein two windings of a six pole armature are wound in double parallel wires, each of said wires being attached to one of the smaller segments.

Whenever the governor 25 is open whereby the contact points 33 and 34 are separated, there are provided two diametrically opposed open circuit positions whereby the armature windings are divided into two equal sections. At X I show the open circuit position between the pairs of coils 43—44 and 45—46 and at Y I show the open circuit position between the pairs of coils 47a—48a and 47b—48b which is open when the governor contacts 33 and 34 separate. The two halves separated at X and Y are thus isolated from each other. There can be no current flow between the two halves except when brushes 21 and 22 bridge the positions X and Y.

At any speed below the predetermined governed speed, the contacts 33 and 34 remain closed, and the armature poles are energized in varying combinations during each rotation. When the brushes 21 and 22 bridge the open circuit positions X and Y, all of the coils are energized. When one of the brushes bridges the gap between the segment 40 and 42a or the gap between the segment 41 and 42b with the other of said brushes contacting either the segment 41 or the segment 40 respectively, the coils 43 to 46 are all energized plus one of the pairs of coils 47a—48a or 47b—48b. Since both said pairs of coils (47a—48a and 47b—48b) are parallel wound upon the same poles of the armature, all of the armature poles are energized for a brief instant in this position.

When one of the brushes contacts only the segment 40 and the other of said brushes contacts only the segment 41, then the coils 43 to 46 are energized and the coils 47a—48a and 47b—48b are de-energized. When one of the brushes contacts only either the small segment 42a or 42b with the opposite brush contacting respectively either the large segment 41 or 40, one of the pairs of coils 43—44 or 45—46 will be energized and one of the pairs 47a—48a and 47b—48b will simultaneously be energized.

From the above, it will be readily seen that due to the parallel coils 47a—47b and 48a—48b, four of the armature windings are energized at all times during rotation when the governor contacts 33 and 34 are closed. During the instant when the brushes 21 and 22 bridge the open circuit positions X and Y which will occur twice in each revolution, all of the six armature windings will be energized. Also, when either one of the brushes 21 or 22 briefly spans the separation between either the pair of segments 40—42a or 41—42b, this position occurring four times in each revolution, all six armature windings will also be energized due to the fact that a path for current is provided either through the coils 47a—48a or the coils 47b—48b.

When the armature attains a speed which is above the predetermined governed speed, the contacts 33 and 34 will separate as hereinbefore described. This creates the two open circuited positions X and Y at diametrically opposite points on the commutator whereby all of the coils are de-energized except for two instances in each revolution when the brushes 21 and 22 bridge the open circuit gaps as illustrated in Fig. 3. In each such instance, all of the coils will be energized. It is desirable, of course, that the two instances of energization of all of the coils be extremely brief whereby they are insufficient to maintain the speed of the armature above the predetermined governed speed. The angle of complete energization will depend upon the width of the brushes and the width of the commutator slots.

It will be understood from the above, therefore, that at all times during the operation of the motor, all of the coils are subject to complete energization twice during each revolution of the armature regardless of whether the governor 25 is in the open or the closed position. When said governor is closed, at least four of the armature windings are energized at all times and all six armature poles are energized six times in each revolution of the armature. The above governor and circuit arrangement make it possible to control the speed of the motor over a wide range of voltage variation and/or changes in load.

Figure 4:
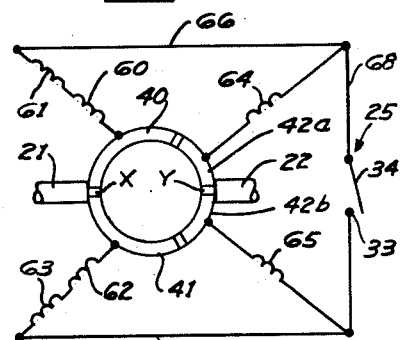
Fig. 4 is a view similar to that of Fig. 3 showing a modification of the armature connections of Fig. 3.

In Fig. 4 I show a variation of the circuit applying the principle of my invention wherein each of the coils 60 to 65 is wound on one or more poles of a six pole armature. Coils 60 and 61 are connected in series with one end thereof attached to the large commutator segment 40. Likewise, coils 62 and 63 are connected in series, the inner end thereof being attached to the large commutator segment 41. The inner end of the coil 64 is attached to the small commutator segment 42a and the inner end of the coil 65 is attached to the segment 42b. The outer ends of the coils 60—61 and 64 are connected by the line 66, and the outer ends of the coils 62—63 and 65 are connected by the line 67. The outer ends of the coils 64 and 65 are connected by the line 68, and there is an open circuit position X between the coils 60—61 and 62—63. The governor 25 is interposed in the line 68 whereby when said governor is open, there is an open circuit position between the coils 64 and 65 at Y.

With this arrangement, all of the coils are energized twice during each revolution of the armature when the brushes 21 and 22 bridge the open circuit positions X and Y. Such momentary energization of all of the coils takes place regardless of whether the governor 25 is in the opened or the closed position. When the governor contacts 33 and 34 are closed and the armature is running below the predetermined governed speed, either three or four of the armature windings will be energized depending upon the position of the brushes 21 and 22. It will be readily seen that when said brushes contact either the segments 40—42b, or 41—42a, three of the armature windings will be energized, and when said brushes contact the segments 40—41, four of said windings will be energized. Additionally, whenever one of the brushes bridges either the gap between the segments 40—42a or 41—42b, five of said windings will be energized. When the governor contacts are in the open position as illustrated in Fig. 4, none of the windings will be energized except during the brief instance when the brushes 21 and 22 bridge the open circuit positions X and Y.

Figure 5:
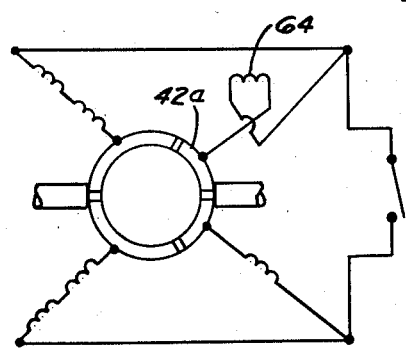
Fig. 5 is a view similar to that of Figs. 3 and 4 showing another modification of the armature connections.

Fig. 5 shows a circuit similar to that shown in Fig. 4 wherein the coil 64 has been reversely connected to the commutator segment 42a. This may be done to lower the current input and thereby reduce the maximum speed of the motor while using substantially the same governor circuit as that shown in the previous embodiments of my invention.

Figure 6:
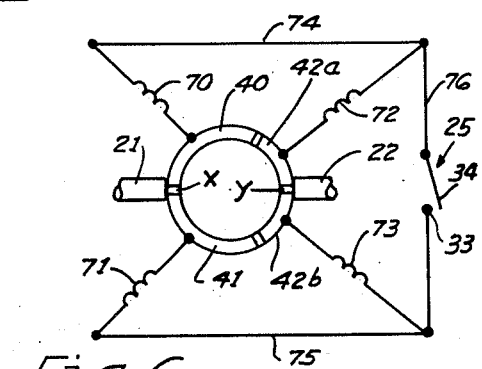
Fig. 6 is a similar view to that of Figs. 3, 4, and 5 showing another modification of the armature connection of my invention.

Fig. 6 shows yet another embodiment of the governor circuit adapted for use with a three pole armature having commutator segments formed as in the previous embodiments. In Fig. 6, each of the coils 70 and 71 is wound on one or more of the three armature poles, and the coils 72 and 73 are parallel wound to form the third armature pole winding. The inner ends of the coils 70 and 71 are respectively attached to the large commutator segments 40 and 41. The inner ends of the coils 72 and 73 are respectively attached to the smaller segments 42a and 42b. The outer ends of the coils 70 and 72 are connected by the line 74, and the outer ends of the coils 71 and 73 are connected by means of the line 75. The outer ends of the coils 72 and 73 are connected by the line 76 in which the governor 25 is interposed. The open circuit position X is provided between the coils 70 and 71 and, when the governor contacts 33 and 34 are separated, between the coils 72 and 73 as indicated at Y.

As in the former embodiments of my invention, the circuit of Fig. 6 provides for energization of all of the coils and therefore, all of the armature poles twice during each revolution of the commutator when the brushes 21 and 22 bridge the open circuit positions X and Y regardless of whether the governor switch 25 is open or closed. When the governor contacts are closed, two of the armature windings are energized at all times during the revolution of the armature, and all three windings are briefly energized when one of the brushes 21 or 22 bridges the gap between either the commutator segments 40—42a or 41—42b.

I also anticipate other possible variations in my improved circuit, not herein illustrated, such as for example, slightly varying the coils 47a—48a and 47b—48b (Fig. 3) either in wire size or number of turns. I also anticipate that all of the coil sections radiating from the commutator segments can be made to differ either in wire size or coil turns to attain particular characteristics in different motors for particular applications without, however, departing from the spirit of my invention or the scope of the appended claims.

What I claim is:

1. An electric motor having a rotating armature, armature coils, a circuit breaking governor switch mounted on said armature, a commutator comprising segments revolvable with said armature, said segments divided into two equal sections having two opposite open circuit positions therebetween, each of said sections comprising relatively large and small segments, said small segments being adjacent one of said open circuit positions, at least one coil connected to each of said segments, the coils of each section being connected in parallel with each other, the coils connected to said smaller segments being connected in parallel through said governor switch when said switch is closed and being disconnected from each other when said switch is open.

2. An electric motor as set forth in claim 1 wherein the recited large segments are substantially twice the size of said small segments.

3. An electric motor having an armature, armature coils, a circuit breaking governor switch mounted on said armature, a commutator comprising segments revolvable with said armature, said segments divided into two equal sections having two opposite open circuit positions therebetween, each of said sections comprising one large and one relatively smaller segments, said smaller segments being substantially half the size of said large segments, said smaller segments being on either side of one of said open circuit positions, at least one coil connected to each of said segments, the coils of each section being connected in parallel with each other, the coils connected to said smaller segments being connected in parallel through said governor switch when said switch is closed and being disconnected from each other when said switch is open.

4. An electric motor having a six pole armature, armature coils for said poles, said coils divided into pairs connected in series with each other, one of said pairs of poles being wound with double, parallel wires, a commutator comprising segments revolvable with said armature, said segments divided into two equal sections having two opposite open circuit positions therebetween, each of said sections comprising one large and one relatively smaller segments, said smaller segments being substantially half the size of said large segments, said smaller segments being disposed on either side of one of said open circuit positions, each of said pairs of coils being connected at one end to one of said segments with the parallel wound coils being divided whereby each of said parallel wires is connected to one of said smaller segments, the coils of each section of segments being connected in parallel with each other, a circuit breaking governor switch mounted to said motor, the parallel wound coils connected to said smaller segments being connected in parallel through said governor switch when said switch is closed and being disconnected from each other when said switch is open.

5. An electric motor having a six pole armature, armature coils for said poles, four of said coils divided into pairs connected in series with each other, a commutator comprising segments mounted to said armature, said segments divided into two equal sections having two opposite open circuit positions therebetween, each of said sections comprising one large and one relatively smaller segments, said smaller segments being substantially half the size of said large segments, said smaller segments being disposed on either side of one of said open circuit positions, each of said pairs of series connected coils being connected to one of said large segments, the remaining two of said coils being each connected to one of said smaller segments, the coils of each section of segments being connected in parallel with each other, a circuit breaking governor switch mounted to said motor, the coils connected to said smaller segments being connected in parallel through said governor switch when said switch is closed and being disconnected from each other when said switch is open.

6. An electric motor having a three pole armature, armature windings, one of said windings being wound with double parallel conductors, a commutator comprising segments mounted to said armature, said segments divided into two equal sections having two opposite open circuit positions therebetween, each of said sections comprising one large and one relatively smaller segments, said smaller segments being substantially half the size of said large segments, said smaller segments being disposed on either side of one of said open circuit positions, each of said windings being connected to one of said segments with the conductors of said parallel wound winding each connected to one of said smaller segments, the coils of each section of segments being connected in parallel with each other, a circuit breaking governor switch mounted to said motor, the conductors of said parallel wound winding being connected in parallel through said governor switch when said switch is closed and being disconnected from each other when said switch is open.

7. An electric motor having an armature including armature poles and coils therefor, a circuit breaking governor switch mounted on said armature, a commutator comprising segments mounted to said armature, said segments divided into two equal sections having two opposite open circuit positions therebetween, each of said sections comprising relatively large and small segments, said small segments being adjacent one of said open circuit positions, at least one coil connected to each of said segments, the coils of each section being connected in parallel with each other, the coils connected to said smaller segments being connected in parallel through said governor switch when said switch is closed and being disconnected from each other when said switch is open, a pair of brushes adapted to contact said commutator at diametrically opposite points thereon, said governor switch adapted to open at a predetermined rate of rotation of said armature, all of said poles being energized whenever said brushes bridge said open circuit positions during rotation of said armature and two-thirds of said poles being energized whenever said armature is rotating and said governor is closed.

No references cited.